United States Patent
Schieß

(10) Patent No.: US 11,603,062 B2
(45) Date of Patent: Mar. 14, 2023

(54) ROLLOVER PROTECTION FOR A VEHICLE

(71) Applicant: ZF Friedrichshafen AG, Friedrichshafen (DE)

(72) Inventor: Marc Schieß, Hohenfels (DE)

(73) Assignee: ZF Automotive Germany GmbH, Alfdorf (DE)

(*) Notice: Subject to any disclaimer, the term of this patent is extended or adjusted under 35 U.S.C. 154(b) by 6 days.

(21) Appl. No.: 16/810,894

(22) Filed: Mar. 6, 2020

(65) Prior Publication Data
US 2020/0282937 A1    Sep. 10, 2020

(30) Foreign Application Priority Data
Mar. 8, 2019 (DE) ............ 10 2019 203 206.0

(51) Int. Cl.
*B60R 21/13* (2006.01)
*B60R 21/0132* (2006.01)
*B60R 21/01* (2006.01)
*B60R 21/00* (2006.01)

(52) U.S. Cl.
CPC ......... *B60R 21/13* (2013.01); *B60R 21/0132* (2013.01); *B60R 2021/0018* (2013.01); *B60R 2021/01013* (2013.01); *B60R 2021/01211* (2013.01); *B60R 2021/01327* (2013.01); *B60R 2021/138* (2013.01)

(58) Field of Classification Search
CPC ............. B60R 21/13; B60R 21/0132; B60R 2021/138; B60R 2021/01211; B60R 2021/01013; B60R 2021/01327; B60R 2021/0018
See application file for complete search history.

(56) References Cited

U.S. PATENT DOCUMENTS

| | | | | |
|---|---|---|---|---|
| 5,338,062 A | * | 8/1994 | Kiuchi | B60R 21/0132 180/274 |
| 5,890,084 A | * | 3/1999 | Halasz | B60R 21/013 701/45 |
| 5,931,499 A | * | 8/1999 | Sutherland | B60R 21/00 280/755 |
| 6,282,474 B1 | * | 8/2001 | Chou | B60R 21/013 180/271 |
| 6,499,796 B1 | * | 12/2002 | Eenhoorn | B60P 3/2285 280/837 |
| 6,883,631 B2 | * | 4/2005 | Hu | B60R 19/205 180/274 |
| 7,828,106 B1 | * | 11/2010 | Ratajski | B60R 21/13 180/282 |
| 2002/0189883 A1 | * | 12/2002 | Lahmann | B60R 21/013 180/282 |

(Continued)

FOREIGN PATENT DOCUMENTS

| | | | |
|---|---|---|---|
| CN | 106 314 343 A | 1/2017 | |
| EP | 2 108 547 | * 10/2009 | B60R 21/13 |

*Primary Examiner* — Frank B Vanaman
(74) *Attorney, Agent, or Firm* — Finch & Maloney PLLC

(57) ABSTRACT

A protection system for a motor vehicle having a sensor for determining an angle of inclination of the motor vehicle about its longitudinal axis. An airbag attached on an outside of the motor vehicle. A processing device designed to detect a risk that the motor vehicle may tip over, on the basis of the inclination angle determined, and in that case activates the airbag. The airbag can be pivoted in the vertical direction from an area close to the ground.

15 Claims, 3 Drawing Sheets

(56) References Cited

U.S. PATENT DOCUMENTS

| | | | |
|---|---|---|---|
| 2006/0043712 A1* | 3/2006 | Hakki | B60R 19/205 |
| | | | 280/735 |
| 2006/0169517 A1* | 8/2006 | Mishra | B60R 21/013 |
| | | | 180/274 |
| 2008/0097699 A1* | 4/2008 | Ono | B62D 15/0265 |
| | | | 701/300 |
| 2017/0106827 A1* | 4/2017 | Barbat | B60R 21/232 |

\* cited by examiner

ROLLOVER PROTECTION FOR A VEHICLE

This application claims priority from German patent application serial no. 10 2019 203 206.0 filed Mar. 8, 2019.

FIELD OF THE INVENTION

The present invention relates to the protection of a motor vehicle against rolling over. In particular the invention relates to protection by means of an airbag.

BACKGROUND OF THE INVENTION

A motor vehicle can start rotating in an uncontrolled manner, for example during an extreme driving maneuver, after crashing into an object or after moving off a street. If the rotation takes place about the vertical axis this is known as skidding, but if it takes place about the longitudinal axis this is called tipping over or, if the rotary movement then continues, as rolling over or tumbling. Particularly when rotating about the longitudinal axis, occupants of the motor vehicle can impact against hard objects inside the vehicle or even be thrown clear of the vehicle and thus injured.

Various proposals have been made for counteracting the overturning of a motor vehicle about its longitudinal axis. CN 106 314 343 relates to the release of airbags attached in pairs to the outside of a motor vehicle when a danger that the vehicle may tilt about its longitudinal axis is detected.

SUMMARY OF THE INVENTION

The existing solutions have been found to be insufficiently effective or practical. A purpose of the present invention is to provide an improved solution for protecting a motor vehicle against tipping over by means of an airbag attached on its outside. The invention achieves this by virtue of the objects of the independent claims. The subordinate claims describe preferred embodiments.

A protection system for a motor vehicle comprises a sensor for determining an angle of inclination of the motor vehicle about its longitudinal axis; an airbag attached on an outside of the motor vehicle; and a processing device designed to determine a threat of tipping over on the basis of the inclination angle detected and in such a case to activate the airbag. In this case the airbag can be extended in the vertical direction from an area near the ground.

Preferably, the airbag is connected to the motor vehicle close to a bottom side of the motor vehicle. It can be pivoted upward by virtue of the flexibility of the airbag or by means of a hinge that connects the airbag to the motor vehicle. When activated, the airbag is filled with a gas, usually by pyrotechnical means. During this the airbag preferably expands in the direction of an upper side of the motor vehicle, particularly toward its roof. A pivot axis about which the airbag can pivot preferably runs essentially parallel to the longitudinal axis.

Thanks to the ability of the airbag to pivot, if there is a risk that the motor vehicle may tip over the vehicle can be better cushioned. During this the airbag can be compressed between a sidewall of the motor vehicle and the ground. The cross-section of the airbag can increase from the bottom toward the top of the motor vehicle.

The risk of tipping over can be determined when the motor vehicle reaches a predetermined tilt angle, usually determined relative to gravity. The predetermined tilt angle can be within a range in which a center of gravity of the motor vehicle standing on flat ground is above a contact point. The contact point is usually formed by the wheels of the motor vehicle against the ground.

It is further preferred that the risk of tipping over is additionally determined on the basis of an angular speed about the longitudinal axis. In that way the risk of tipping over can be determined earlier, so that there is more time to control the activation of the airbag. The angular speed can be determined by means of a dedicated sensor, in particular a micro-mechanical rotational speed sensor, or on the basis of a derivative of the tilt angle with respect to time.

In yet another embodiment the risk of tipping over is additionally determined on the basis of a rotational acceleration about the longitudinal axis. For this a dedicated, in particular micro-mechanical rotational acceleration sensor can be provided, or the rotational acceleration can be determined as the derivative of the rotational speed with respect to time.

The airbag usually has an envelope and a gas generator for filling the airbag with gas. The processing device can be designed to activate the gas generator in such manner that the airbag produces a rotational impulse on the motor vehicle about the longitudinal axis, which impulse opposes the rotational movement of the motor vehicle. For this, the airbag can in particular be filled with more gas when it is already resting between the motor vehicle and the ground. Then the airbag can act in the manner of a supporting wheel and impede the rolling of the motor vehicle.

A time and a rate variation of the filling of the airbag with gas can be controllable. For example a number of explosive charges can be available, each of which can release a predetermined volume of gas into the airbag such that a sequence of ignitions of individual charges is controllable. A first charge can be ignited in order to deploy and position the airbag. Later, a further charge can be ignited in order to deliver the rotational impulse, when the airbag is in contact on both sides. Not all the charges present have to be ignited.

In addition to the envelope and gas generator, a discharge valve can be provided for discharging gas from the airbag. The rotation of the motor vehicle can be damped as gas flows out through the discharge valve when the airbag is compressed between the motor vehicle and the ground, particularly when the motor vehicle is tipping over. A time or a speed variation of the discharge can be controllable. For this, one or more discharge valves can be provided, which at a predetermined gas pressure in the airbag open automatically in a predetermined way and release a flow of gas into the surroundings. Alternatively, a discharge valve that can be controlled dynamically by the processing device can be provided, which can release a variable gas flow.

In a particularly preferred embodiment the protection system comprises a contact element attached to the side of the airbag facing away from the motor vehicle. The contact element is preferably designed to lie between the airbag and the ground. The airbag can in this way be protected against damage by an obstacle in the area of the ground. Furthermore, a force transfer can take place between the airbag and the ground in a more uniform or reliable manner.

The contact element is preferably attached firmly to the airbag and, when the airbag is activated, the element is distanced from the motor vehicle by the expanding airbag. Before that activation, the contact element can protect the airbag on the motor vehicle and can constitute a surface of the vehicle. In particular, an aerodynamically favorable cladding of the empty airbag can be produced.

In addition or alternatively, a covering element can be used in order, before activation takes place, to hold the airbag and if necessary the contact element together onto the motor vehicle. When the airbag is activated, the covering element can remain fixed on the motor vehicle. for example the covering element can tilt out of the way or even split open in order to release the airbag.

In an embodiment the covering element is connected to the motor vehicle in an area close to the ground in such manner that it can pivot upward in the vertical direction, for which purpose a hinge can be provided whose pivot axis can extend essentially parallel to the longitudinal axis of the motor vehicle. In this case the airbag can be pivotably connected by the hinge of the covering element.

The airbag can be designed to be attached in particular in the area of a B-pillar of the motor vehicle. Alternatively or in addition, an airbag can be provided for attachment in the area of a C-pillar of the motor vehicle. This enables the airbag to lie in the longitudinal direction of the motor vehicle in an area where after unfolding, the airbag can be in contact with a large surface area of the motor vehicle. This means that even a moderate gas pressure in the airbag can produce a large force between a surface and the motor vehicle.

According to a further aspect of the invention, a system consists of a motor vehicle and a protection system as described herein. The motor vehicle can in particular include a passenger car, a bus or a motorcycle. Occupants of the motor vehicle can be better protected against the risk of injury in the event of tipping over or rollover.

According to yet another aspect of the invention, a method for controlling a protection system on a motor vehicle comprises the steps of determining an inclination angle of a motor vehicle about its longitudinal axis; detecting a risk with reference to the amount of tilting, on the basis of the inclination angle determined; and activating an airbag attached on the outside of the motor vehicle, which can be pivoted upward in the vertical direction from an area close to the ground.

The processing device can be designed to implement a method as described herein, whether partially or in full. For that, the processing device can comprise a programmable micro-computer or micro-controller and the method can take the form of a computer program product with program code means. The computer program product can also be stored on a computer-readable data carrier. Features or advantages of the method can be transferred to the protection system, or vice-versa.

In a further development of the method, a first and a second airbag can be attached on opposite sides of the motor vehicle. The first airbag can be activated when there is a risk of tipping and the second airbag when the motor vehicle is rolling over. Rollover preferably involves contact between a roof area of the motor vehicle and the ground. By activating the second airbag, if the rotational movement of the motor vehicle about its longitudinal axis is not sufficiently braked the motor vehicle can be braked a second time. Thus, rolling of the motor vehicle about its longitudinal axis can be counteracted.

BRIEF DESCRIPTION OF THE DRAWINGS

The invention will now be described in greater detail with reference to the attached figures, which show.

DETAILED DESCRIPTION OF THE PREFERRED EMBODIMENTS

Figure 1:
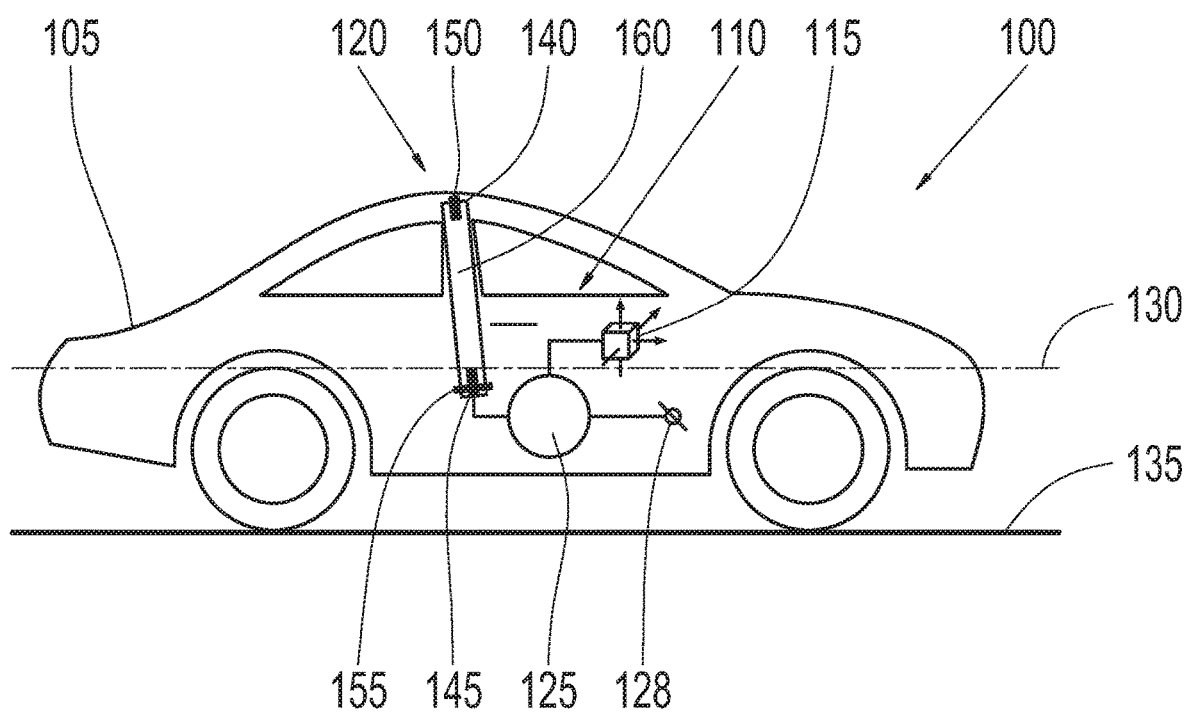
FIG. 1: A system.

FIG. 1 shows a system 100 comprising a motor vehicle 105 and a protection system 110 attached thereto. The protection system comprises a sensor 115, an airbag 120 and a processing device 125. Other possible expressions denoting the airbag 120 are a crash-bag or air-cushion. Optionally, an interface is provided for connecting a further system on board the motor vehicle 105, which can supply information for the processing device 125.

The sensor 115 is designed to determine an angle of inclination of the motor vehicle 105 about a longitudinal axis 130. The inclination angle is preferably determined with respect to gravity. Alternatively, the inclination angle can also be determined relative to a ground surface on which the motor vehicle 105 is located.

The processing device 125 is designed to activate the airbag 120 when there is a risk that the motor vehicle 105 may tip over. For that purpose, on the basis of the inclination angle, an angular speed or an angular acceleration, the processing device can determine whether there is a risk of tipping over. Optionally other variables too, such as a driving speed of the motor vehicle 105 or a rotation about an axis other then the longitudinal axis 130 can be obtained and evaluated by the interface 128.

The airbag 120 comprises an envelope 140 and a gas generator 145. The envelope 140 is preferably made of a tear-resistant, flexible material and, also preferably, is gas-tight in order to retain a gas inside the envelope 140 at least for a short time. The gas generator 145 can be activated by the processing device 125 and usually operates by pyrotechnic means. For this one or more explosive charges can be provided, which can be ignited one after another or simultaneously. At least the first charge is usually ignited electrically; a further charge can be ignited later after a pyrotechnically realized delay.

Optionally, a discharge valve 150 is provided for discharging the gas from the envelope 140. The discharge valve 150 can be in the form of a general, predetermined permeability of the envelope 140 or a dedicated device. The discharge valve 150 can be controllable, for example on the basis of a gas pressure in the envelope 140, a pressure difference between different sides of the envelope 140, or even electrically by means of the processing device 125.

Preferably, the airbag 120 is attached on the motor vehicle 105 in a lower area of the motor vehicle 105, close to the ground. To begin with the airbag 120 is essentially empty and is preferably folded together in a predetermined manner. In a first variant the airbag 120 itself is attached at some points to the motor vehicle 105 itself, and in a second variant it is attached to the motor vehicle 105 by means of a hinge 155. In both variants the airbag 120 can unfold or pivot in the vertical direction, such that a folding or pivoting axis preferably extends essentially parallel to the longitudinal axis 130 of the motor vehicle 105.

On a side facing away from the motor vehicle 105, the airbag 120 can be attached to a contact element 160. The side concerned faces toward a person looking at FIG. 1. The contact element 160 can be attached to the motor vehicle 105 by means of the hinge 155. The contact element 160 is designed, when the airbag is filled with gas, to tilt away from the motor vehicle 105 in the vertical direction and form a contact surface for the airbag 120, which is opposite a side surface of the motor vehicle 105 relative to the blown-up airbag 120. As will be shown in more detail later, the contact element 160 can in particular be in contact with the ground 135 if the motor vehicle 105 tips over far enough.

Figure 2:
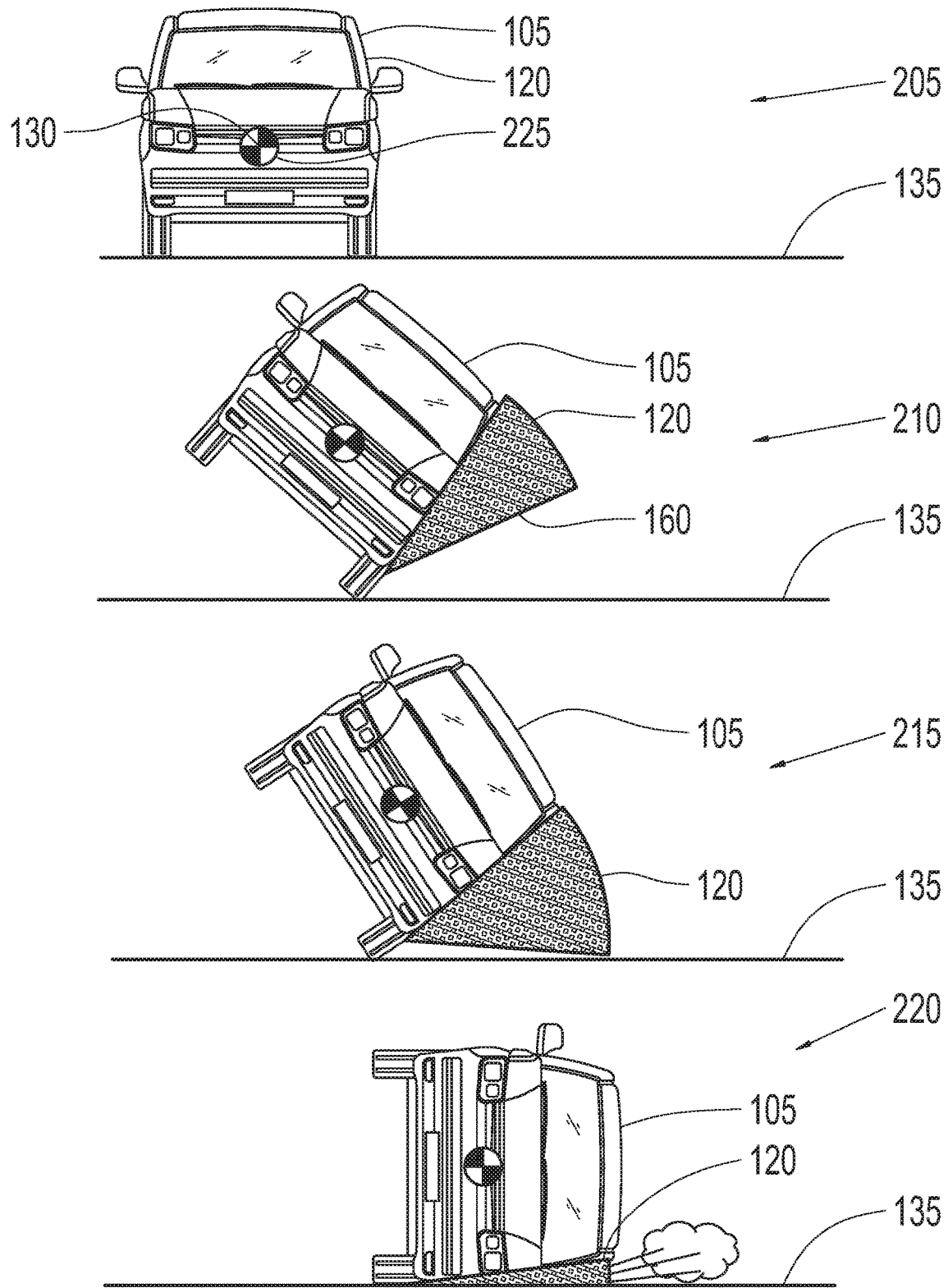
FIG. 2: Examples of phases when a motor vehicle is tipping over.

FIG. 2 shows, from top to bottom, four example phases 205 to 220 of a motor vehicle 105 that is tipping over. The motor vehicle 105 is driving in the direction toward the observer, so that its longitudinal axis is perpendicular to the plane of the drawing. A center of gravity 225 of the motor vehicle 105 is located, for example, on the longitudinal axis 130.

In the first phase 205, the motor vehicle 105 is at rest or driving on the ground 135. In the present case the motor vehicle 105 has four tires, all of them in contact with the ground 135. For example due to an inclination of the ground toward the side, the motor vehicle 105 then begins to rotate or tilt about its longitudinal axis 130.

In the second phase 210 the center of gravity is approximately above a ground contact point of the motor vehicle 105 on the ground 135. If the rotational speed about the longitudinal axis 130 is zero, the motor vehicle 105 is in equilibrium. If it is more than zero, a tilting of the motor vehicle 105 on the left-hand side in the representation shown in FIG. 2 cannot be prevented without applying a torque or impulse that acts opposite to the rotation. Whether the point of equilibrium is reached and at what approximate angular speed, can be calculated already in advance on the basis of the angle of inclination and at least one of its derivatives.

In the first phase 205 or in the second phase 210, the airbag 120 can be released so that it begins to unfold. As shown, the airbag 120 is preferably attached in an area of the motor vehicle 105 which usually faces toward the bottom of the vehicle or the ground 135, in such manner that it can pivot. The airbag 120 is preferably located between the motor vehicle 105 and the contact element 160, which pivots away from the motor vehicle 105 due to the filling airbag 120.

In the third phase 215, the contact element 160 is in contact against the ground 135 and due to its internal pressure the airbag 120 can exert a force between the motor vehicle 105 and the ground 135. In an embodiment, by controlling the internal pressure of the airbag 120 the force can be used to exert a rotary impulse on the motor vehicle 105 that acts to oppose its rotation. In that way the rotation can be made slower or ideally reversed, so that the motor vehicle 105 can again approach its initial position (see the first phase 205).

Alternatively, or if the counter-impulse cannot stop the rotation, in the fourth phase 220 the airbag 120 can be emptied in a controlled manner. For that purpose, gas is discharged through the discharge valve 150 in order to dampen the rotational movement of the motor vehicle 105, as illustrated graphically.

Figure 3:
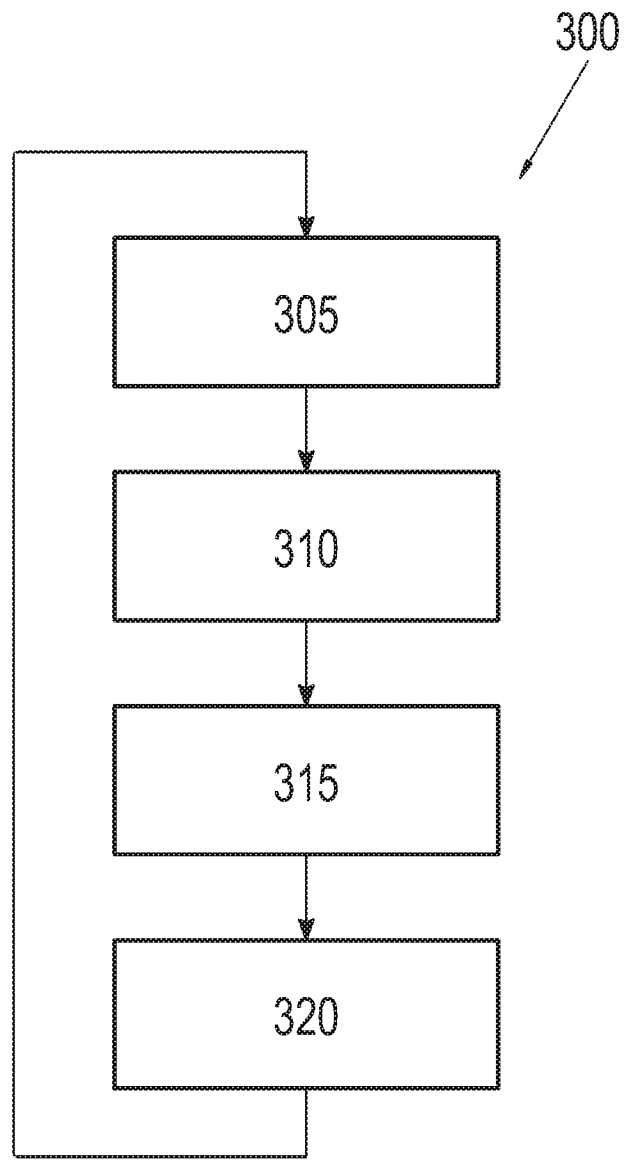
FIG. 3: A flow diagram of a method.

FIG. 3 shows a flow diagram of a method 300 for protecting a motor vehicle 105 against tipping over. The method 300 can be implemented in particular with a motor vehicle 105 that comprises a protection system 110.

In a step 305 a risk that the motor vehicle 105 might tip over is determined. There is a risk of tipping over if an inclination angle, an angular speed and/or an angular acceleration of the inclination angle exceed a respectively assigned threshold value. The threshold value can depend on some other variable of the motor vehicle 105, in particular a variable that describes a driving condition, such as a speed.

In a step 310 an influence of the surroundings can be determined. The influence of the surroundings can in particular describe a driving situation and for example can relate to an inclination of the ground 135 or an estimated frictional value relative to the ground.

In a step 315 the airbag 120 can be activated. A point in time and/or a variation of the rate of filling of the airbag 120 with gas can be controlled, in particular as a function of the inclination angle or one of its derivatives or as a function of one of the influences of the surroundings determined. In different embodiments the filling of the airbag 120 can be controlled in order to reduce a rotational impulse of the motor vehicle 105 by damping it, or to produce an opposing rotational impulse. Thus, tipping over of the motor vehicle 105 can be prevented or at least made slower.

In a step 320 it can be determined whether the measure adopted has been successful. An insufficient result can be determined if there is still a risk that the motor vehicle 105 will roll farther about its longitudinal axis 130 so that there is a threat that the other side surface will come into contact with the ground 135. In such a case the system can revert to the beginning of the method 300 and the process 300 can be repeated in order, if necessary, to deploy a second airbag 120 on the side of the motor vehicle 105 opposite the airbag 120 that has already been deployed. Otherwise, the method 300 ends after that step.

INDEXES

100 System
105 Motor vehicle
110 Protection system
115 Sensor
120 Airbag
125 Processing device
128 Interface
130 Longitudinal axis
135 Ground
140 Envelope
145 Gas generator
150 Discharge valve
155 Hinge
160 Contact element
205 First phase
210 Second phase
215 Third phase
220 Fourth phase
225 Center of gravity
300 Method
305 Determination of the risk of tipping over
310 Determination of the influence of the surroundings
315 Activation of the airbag
320 Assessment of the result

The invention claimed is:

1. A protection system for a motor vehicle, the protection system comprises:
   a sensor for determining an angle of inclination of the motor vehicle about a longitudinal axis of the motor vehicle;
   an airbag attached on an outside of the motor vehicle in an area of the motor vehicle adjacent a ground surface on which the motor vehicle travels;
   wherein the airbag is attached to a contact element so that the airbag is located between the outside of the motor vehicle and the contact element;
   a processing device, designed to detect a risk of the motor vehicle tipping over based on the determined angle of inclination, and to activate the airbag when a risk of the motor vehicle tipping over is detected, the airbag is pivotable out from the area of the motor vehicle adjacent the ground surface on which the motor vehicle travels, in a vertical direction such that the contact element, which remains attached to the airbag after the airbag is activated, forms a contact surface for the airbag.

2. The protection system according to claim 1, wherein the risk of the motor vehicle tipping over is additionally determined on a basis of an angular speed of the motor vehicle about the longitudinal axis.

3. The protection system according to claim 1, wherein the risk of the motor vehicle tipping over is additionally determined on a basis of a rotational acceleration of the motor vehicle about the longitudinal axis.

4. The protection system according to claim 1, wherein the airbag comprises an envelope and a gas generator for filling the envelope with gas, and the processing device is designed to activate the gas generator in such a manner that a rotational impulse is exerted on the motor vehicle, about the longitudinal axis, so as to oppose rotational movement of the motor vehicle.

5. The protection system according to claim 1, wherein the airbag comprises an envelope, a gas generator for filling the envelope with gas, and a discharge valve for discharging the gas.

6. The protection system according to claim 1, wherein the contact element is connected to the motor vehicle in the area adjacent the ground surface and is pivotable in the vertical direction.

7. The protection system according to claim 1, wherein the airbag is designed to be attached to the motor vehicle in an area of a B-pillar of the motor vehicle.

8. The protection system according to claim 1, wherein the airbag, when activated, extends from a bottom side of the motor vehicle to a roof of the motor vehicle.

9. The protection system according to claim 8, wherein a cross-section of the airbag, when activated, increases from the bottom side of the motor vehicle to the roof of the motor vehicle.

10. A system comprising a motor vehicle with a protection system having a sensor for determining an angle of inclination of the motor vehicle about a longitudinal axis of the motor vehicle;
an airbag attached on an outside of the motor vehicle in an area of the motor vehicle adjacent a ground surface on which the motor vehicle travels;
wherein the airbag is attached to a contact element so that the airbag is located between the outside of the motor vehicle and the contact element;
a processing device, designed to detect a risk of the motor vehicle tipping over based on the determined angle of inclination, and to activate the airbag when a risk of the motor vehicle tipping over is detected, the airbag is pivotable out from the area of the motor vehicle adjacent the ground surface upon which the motor vehicle travels, in a vertical direction such that the contact element, which remains attached to the airbag after the airbag is activated, lies between the air bag and the ground surface and forms a contact surface for the airbag.

11. A method for controlling a protection system of a motor vehicle, the protection system having a sensor for determining an angle of inclination of the motor vehicle about a longitudinal axis of the motor vehicle; a first airbag attached on an outside of the motor vehicle in an area of the motor vehicle adjacent a ground surface on which the motor vehicle travels; a contact element attached to the first airbag so that the first airbag is located between the outside of the motor vehicle and the contact element; a processing device, designed to detect a risk of the motor vehicle tipping over based on the determined angle of inclination, and to activate the first airbag when a risk of the motor vehicle tipping over is detected, the first airbag is pivotable in a vertical direction from the area of the motor vehicle adjacent the ground surface upon which the motor vehicle travels, the method comprising:
determining the angle of inclination of the motor vehicle about the longitudinal axis of the motor vehicle;
detecting the risk of the motor vehicle tipping over based on the determined angle of inclination of the motor vehicle; and
activating the first airbag, attached on the outside of the motor vehicle and which is pivotable in the vertical direction from the area of the motor vehicle adjacent the ground surface upon which the motor vehicle travels, such that the contact element, which remains attached to the first airbag after the first airbag is activated, is directed to lie between the air bag and the ground surface to form a contact surface for the first airbag.

12. The method according to claim 11, further comprising attaching a second airbag on a side of the motor vehicle opposite from the first airbag;
activating the first airbag when the risk of the motor vehicle tipping over is detected; and
activating the second airbag when a roof of the motor vehicle contacts the ground surface.

13. The method accordingly to claim 12, wherein the second airbag is activated after the first airbag is activated.

14. The method according to claim 11, wherein activation of the first airbag is controlled to reduce a rotational impulse of the motor vehicle by damping the rotational impulse to prevent tipping over.

15. The method according to claim 11, wherein activation of the first airbag is controlled to produce a rotational impulse opposing a rotational movement of the motor vehicle about the longitudinal axis when the motor vehicle is tipping over.

* * * * *